(12) United States Patent
Huang et al.

(10) Patent No.: US 10,890,890 B2
(45) Date of Patent: Jan. 12, 2021

(54) SMART ADJUSTMENT SYSTEM AND METHOD THEREOF

(71) Applicant: COSEN MECHATRONICS CO., LTD., Hsinchu (TW)

(72) Inventors: Mu-Shui Huang, Hsinchu (TW); Ying-Fan Wu, Hsinchu (TW); Hsueh-Ju Li, Hsinchu (TW); Hsiao-Yen Chung, Hsinchu (TW); Liang-Yu Chen, Hsinchu (TW)

(73) Assignee: COSEN MECHATRONICS CO., LTD., Hsinchu (TW)

( * ) Notice: Subject to any disclaimer, the term of this patent is extended or adjusted under 35 U.S.C. 154(b) by 41 days.

(21) Appl. No.: 16/143,549

(22) Filed: Sep. 27, 2018

(65) Prior Publication Data

US 2019/0391554 A1 Dec. 26, 2019

(30) Foreign Application Priority Data

Jun. 21, 2018 (TW) .............................. 107121217 A

(51) Int. Cl.
    *G05B 19/18* (2006.01)
    *B23Q 15/12* (2006.01)
    *G06N 3/02* (2006.01)
(52) U.S. Cl.
    CPC ........... *G05B 19/182* (2013.01); *B23Q 15/12* (2013.01); *G06N 3/02* (2013.01)

(58) Field of Classification Search
    CPC ......... B23Q 15/12; G06N 3/02; G05B 19/182
    See application file for complete search history.

(56) References Cited

U.S. PATENT DOCUMENTS

| | | | |
|---|---|---|---|
| 2007/0179767 A1* | 8/2007 | Cullick | G06F 17/5009 703/10 |
| 2015/0081222 A1* | 3/2015 | Laing | E21B 49/003 702/9 |
| 2019/0041845 A1* | 2/2019 | Cella | G05B 19/41875 |
| 2019/0102657 A1* | 4/2019 | SayyarRodsari | G05B 23/0281 |

* cited by examiner

*Primary Examiner* — Chad G Erdman
(74) *Attorney, Agent, or Firm* — WPAT, PC

(57) ABSTRACT

A smart adjustment system is provided, which may include a cloud computing device and a data acquisition device. The cloud computing device may include a neural network model saving the model data of machine tools, and the estimated increase percentages of each machine tool in different cutting parameters. The data acquisition device may receive the model data of a target machine tool. The could computing device may compare the model data of the target machine tool with the model data of the machine tools via the neural network model in order to calculate an estimated cutting parameter with an estimated increase percentage and control the target machine tool to perform a machining process by the estimated cutting parameter.

18 Claims, 6 Drawing Sheets

SMART ADJUSTMENT SYSTEM AND METHOD THEREOF

CROSS REFERENCE TO RELATED APPLICATION

This application also claims priority to Taiwan Patent Application No. 107121217 filed in the Taiwan Patent Office on Jun. 21, 2018, the entire content of which is incorporated herein by reference.

TECHNICAL FIELD

The present disclosure relates to an adjustment system, in particular to a smart adjustment system based on Big Data analysis and artificial intelligence. The present disclosure further relates to the smart adjustment method of the smart adjustment system.

BACKGROUND

Generally speaking, the industrial competitiveness of a country can be evaluated according to the technology and the output of the machine tool industry of the country. Thus, many countries attach great importance to the development of the machine tool (e.g. bandsaw machine, lathe, milling machine, etc.).

For a machine tool, setting cutting parameter is a very important step. For instance, when a user uses a bandsaw machine to cut a workpiece, the user should set a proper cutting parameter, such as rotational speed of cutting tool (bandsaw) and feed rate of cutting tool (bandsaw), for the bandsaw machine so as to avoid that the cutting tool and the workpiece are damaged, and achieve great cutting quality. On the contrary, improper cutting parameter may damage the cutting tool (bandsaw) or workpiece, which may result in enormous loss.

However, there is, currently, no effective method to immediately determine whether a bandsaw machine is performing a machining process via a proper cutting parameter during the bandsaw machine is in operation. If the cutting parameter is improperly changed, the bandsaw and the workpiece may be damaged; for the reason, the user does not usually change the cutting parameter.

Besides, the user also needs to manually input the basic information, such as material type of workpiece, into the bandsaw machine. The information manually inputted in the bandsaw machine may be incorrect because of human error, which may damage the bandsaw and the workpiece, and then result in serious loss. However, there is, currently, no effective method to determine whether the information inputted in the bandsaw machine is correct.

Therefore, it has become an important issue to provide a cutting parameter adjustment technology in order to effectively solve the above problems.

SUMMARY

The present disclosure is related to a smart adjustment system. In one embodiment of the disclosure, the smart adjustment system may include a cloud computing device and a data acquisition device. The cloud computing device may include a neural network model saving the model data of machine tools, and the estimated increase percentages of each machine tool in different cutting parameters. The data acquisition device may receive the model data of a target machine tool. The could computing device may compare the model data of the target machine tool with the model data of the machine tools via the neural network model in order to calculate an estimated cutting parameter with an estimated increase percentage and control the target machine tool to perform a machining process by the estimated cutting parameter.

The present disclosure is further related to a smart adjustment method, which may include the following steps: establishing a neural network model saving model data of a plurality of machine tools, and the estimated increase percentages of each of the machine tools in a plurality of cutting parameters; receiving the model data of a target machine tool; comparing the model data of the target machine tool with the model data of the machine tools via the neural network model to calculate an estimated cutting parameter having an estimated increase percentage; and controlling the target machine tool to perform a machining process by the estimated cutting parameter.

In one embodiment of the present disclosure, the model data of each of the machine tools may include one or more of machine model, workpiece model and cutting model.

In one embodiment of the present disclosure, the estimated cutting parameter may include one or more of rotational speed of cutting tool and feed rate of cutting tool.

In one embodiment of the present disclosure, the data acquisition device may receive the actual increase percentage of the target machine tool performing the machining process and the cloud computing device may perform a comparison process to compare the estimated increase percentage with the actual increase percentage in order to generate a comparison result.

In one embodiment of the present disclosure, if the comparison result shows that the difference between the estimated increase percentage and the actual increase percentage is higher than a threshold value, the cloud computing device may add 1 to a count value, generate a suggested cutting parameter according to a cutting parameter table and re-perform the comparison process according to the actual increase percentage of the target machine tool performing the machining process by the suggested cutting parameter.

In one embodiment of the present disclosure, if the count value is higher than a count threshold value, the cloud computing device performs a remodeling process to generate a new neural network model and generates the suggested cutting parameter via the new neural network model.

In one embodiment of the present disclosure, if the comparison result shows that the difference between the estimated increase percentage and the actual increase percentage is lower than a threshold value, the cloud computing device performs a cutting parameter optimization process.

In one embodiment of the present disclosure, the data acquisition device may further receive the vibration data of the target machine tool.

In one embodiment of the present disclosure, the cloud computing device may calculate a plurality of candidate cutting parameters and vibration correction data according to the model data and the vibration data of the target machine tool via the neural network model during the cutting parameter optimization process so as to determine the candidate cutting parameter having the lowest estimated increase percentage to serve as a suggested cutting parameter.

In one embodiment of the present disclosure, the cloud computing device may estimate the cutting tool residual service life of the target machine tool by analyzing the vibration data of the target machine tool.

In one embodiment of the present disclosure, the cloud computing device may analyze the vibration data of the target machine tool via a learning algorithm to generate a pattern fingerprint and generates a material analysis result according to the pattern fingerprint.

In one embodiment of the present disclosure, the cloud computing device may further analyze a plurality of cutting factors of each of the machine tools to generate the factor weight directivities of the cutting factors and integrates the factor weight directivities of the cutting factors with the neural network model.

In one embodiment of the present disclosure, the data acquisition device further receives the cutting factors of the target machine tool and the cloud computing device analyzes the cutting factors via the neural network model in order to generate a machine evaluation of the target machine tool.

In one embodiment of the present disclosure, the cutting factors may include one or more of rotational speed of cutting tool, feed rate of cutting tool, accumulated cutting area, skewness of cutting tool, width of workpiece, material of cutting tool, teeth number of cutting tool, current of motor, hydraulic temperature, vibration and temperature of coolant.

In one embodiment of the present disclosure, the cloud computing device may further analyze the cutting factors of the target machine tool in order to obtain the healthy status value of one or more of the components of the target machine tool.

The smart adjustment system and the method thereof according to the embodiments of the present disclosure may have one or more of the following advantages:

(1) In one embodiment of the present disclosure, the smart adjustment system can establish a neural network model via Big Data analysis and provide an estimated cutting parameter for a target machine tool; then, the smart adjustment system can optimize the cutting parameter of the target machine tool via a cutting parameter optimization process; thus, the smart adjustment system can make sure that the machining process can be smooth without being interrupted, such that the target machine tool can achieve the best benefit.

(2) In one embodiment of the present disclosure, the smart adjustment system can immediately modify the cutting parameter of a target machine tool when the target machine tool is in operation, so can realize best machining quality and effectively prevent the cutting tool and the workpiece from being damaged.

(3) In one embodiment of the present disclosure, the smart adjustment system can analyze the vibration data of a target machine tool to generate a pattern fingerprint and generate a material analysis so as to find out the material of the workpiece, which can effectively prevent form losses due to human error.

(4) In one embodiment of the present disclosure, the smart adjustment system can analyze the cutting factors of a target machine tool via the neural network model to generate the machine evaluation of the target machine tool, so the user can more clearly understand the current status of the target machine tool.

(5) In one embodiment of the present disclosure, the smart adjustment system can analyze the vibration information and the cutting factors of a target machine tool to generate the cutting tool residual service life and the healthy status value of each of the components of the target machine tool, so the user can more clearly understand the healthy statuses of the cutting tool and all components of the target machine tool, which can better the efficiency of the maintenance for the target machine tool.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
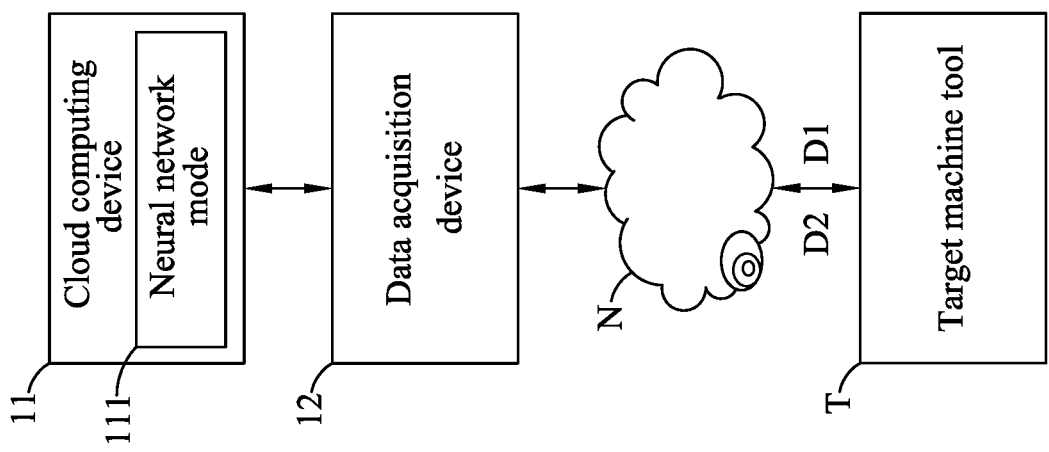
FIG. 1 is a block diagram of a smart adjustment system in accordance with a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a block diagram of a smart adjustment system in accordance with a first embodiment of the present disclosure. As shown in FIG. 1, the smart adjustment system 1 includes a cloud computing device 11 and a data acquisition device 12, which can adjust the cutting parameter of a target machine tool T. The target machine tool T may be any one of various cutting devices; the embodiment uses a bandsaw machine as an illustration to describe the technical content of the smart adjustment system 1.

The cloud computing device 11 includes a neural network model 111; the neural network model 111 saves the model data of a plurality of machine tools, and the estimated increase percentages of each machine tool in different cutting parameters (e.g. rotational speed of cutting tool, feed rate of cutting tool, etc.). The data acquisition device may receive the model data of a target machine tool. The neural network model 111 can be established by a training process in advance.

During the training process, the cloud computing device 11 collects the historical data from the above machine tools, which may include the model data of the machine tools, rotational speeds of cutting tools, feed rates of cutting tools, currents of motors, hydraulic temperatures, temperatures of coolants, temperatures of gear boxes, vibration data, accumulated cutting areas, offsets of cutting tools (e.g. bandsaw), etc. The model data may include model of machine, model of workpiece, model of cutting tool, etc. The model of cutting tool may include teeth number of cutting tool, material of cutting tool, etc. The above data can be pre-processed and normalized via Big Data analysis in order to establish the neural network model 111. Finally, the cloud computing device 11 can obtain the estimated increase percentages of each machine tool in different cutting parameters via the neural network model 111.

The data acquisition device 12 receives the model data D1 of the target machine tool T via a network N, which may include model of machine, model of workpiece, model of cutting tool, etc. Besides, the data acquisition device 12 further keeps collecting various operational data, such as cutting parameter (e.g. rotational speed of cutting tool, feed rate of cutting tool, etc.), current of motor, hydraulic temperature, temperature of coolant, temperature of gear box, vibration data, accumulated cutting area, offset of cutting tool (e.g. bandsaw), from the target machine tool T via the network N. Then, the cloud computing device 11 compares the model data D1 of the target machine tool T with the model data of the above machine tools so as to confirm whether the model data D1 of the target machine tool T are corresponding to the training data of the neural network model 111. After the cloud computing device 11 confirms that the model data D1 of the target machine tool T are corresponding to the training data of the neural network model 111, the cloud computing device 11 pre-process the collected data (e.g. remove the incorrect data and select proper data) and finds out an estimated cutting parameter matching the model data D1 of the target machine tool T according to the pre-processed data via the neural network model 111. Meanwhile, the cloud computing device 11 calculates the estimated increase percentage of performing a machining process by the estimated cutting parameter; the estimated cutting parameter may include rotational speed of cutting tool, feed rate of cutting tool, etc. Afterward, the target machine tool T performs a machining process by the estimated cutting parameter.

Then, the data acquisition device 12 receives the actual increase percentage D2 of the target machine tool T performing the machining process via the network N and the cloud computing device 11 performs a comparison process. During the comparison process, the cloud computing device 11 compares the estimated increase percentage with the actual increase percentage D2 in order to generate a comparison result.

If the comparison result shows that the difference between the estimated increase percentage and the actual increase percentage D2 is lower than a threshold value, the cloud computing device 11 performs a cutting parameter optimization process. The cloud computing device 11 calculates all possible values of the cutting parameter according to the data collected from the target machine tool T. For example, the cloud computing device 11 determines the rotational speed range of the cutting tool according to the width of the workpiece, selects the proper rotational speed of the cutting tool from the rotational speed range, determines the feed rate of the cutting tool according to MORSE formula and modifies the vibration data by Autoencoder neural network (Autoencoder NN) model. Next, the cloud computing device 11 calculates a plurality of candidate cutting parameters and vibration correction data according to the above data via the neural network model so as to determine the candidate cutting parameter having the lowest estimated increase percentage to serve as a suggested cutting parameter. Afterward, the cloud computing device 11 controls the target machine tool T to perform the machining process via the suggested cutting parameter. Via the above cutting parameter optimization process, the target machine tool T can obtain the optimized cutting parameter to perform the machining process.

On the contrary, if the comparison result shows that the difference between the estimated increase percentage and the actual increase percentage D2 is higher than the threshold value, the cloud computing device 11 saves the current data and adds 1 to the count value. Meanwhile, the cloud computing device 11 generates a suggested cutting parameter by searching a cutting parameter table and re-performs the comparison process according to the actual increase percentage D2 of the target machine tool T performing the machining process by the suggested cutting parameter so as to obtain the difference between the estimated increase percentage of the suggested cutting parameter and the actual increase percentage D2.

If the count value is higher than a count threshold value and the cutting parameter optimization process has yet to be triggered, the cloud computing device 11 performs a remodeling process. During the remodeling process, the cloud computing device 11 generates a new neural network model according to the current data and generates the suggested cutting parameter via the new neural network model. Then, the cloud computing device 11 controls the target machine tool T to perform the machining process via the suggested cutting parameter.

If the cloud computing device 11 confirms that the model data D1 of the target machine tool T are not corresponding to the training data of the neural network model 111, the cloud computing device 11 tries to find out the cutting parameter of another machine tool having the same model data D1 to serve as the suggested cutting parameter. If the cloud computing device 11 cannot find out the cutting parameter of another machine tool having the same model data D1, the cloud computing device 11 searches the cutting parameter chart to provide the suggested cutting parameter.

In addition, the cloud computing device 11, during the training process, further analyzes a plurality of cutting factors of each of the machine tools to generate the factor weight directivities of the cutting factors and then integrates the factor weight directivities of the cutting factors with the neural network model 111. More specifically, these cutting factors includes one or more of rotational speed of cutting tool, feed rate of cutting tool, accumulated cutting area, skewness of cutting tool, width of workpiece, material of cutting tool, teeth number of cutting tool, current of motor, hydraulic temperature, vibration and temperature of coolant, etc. Thus, the cloud computing device 11 can analyze the cutting factors of the target machine tool T via the neural network model 111 to generate a machine evaluation in order to provide a criterion for the user to more clearly understand the current status of the target machine tool T.

Moreover, the cloud computing device 11 can further analyze the cutting factors of the target machine tool T via the neural network model 111 to generate the healthy status value of each of the components of the target machine tool T and analyze the vibration data of the target machine tool T to estimate the cutting tool residual service life of the target machine tool, which can serve as the references for the user to maintain the target machine tool T.

As described above, via the above process, the cloud computing device 11 can calculate an optimized suggested cutting parameter to immediately modify the cutting parameter of the target machine tool T. Therefore, the target machine tool T can achieve the lowest increase percentage when performing the machining process by the suggested cutting parameter, which can realize best machining quality and effectively prevent the cutting tool and the workpiece from being damaged. Besides, the cloud computing device 11 can further provide the healthy status value of each of the components and the cutting tool residual service life of the target machine tool T, which can better the efficiency of the maintenance for the target machine tool T.

The embodiment just exemplifies the present disclosure and is not intended to limit the scope of the present disclosure; any equivalent modification and variation according to the spirit of the present disclosure is to be also included within the scope of the following claims and their equivalents.

It is worthy to point out that there is, currently, no effective method to immediately determine whether a bandsaw machine is performing a machining process via a proper cutting parameter during the bandsaw machine is in operation; thus, the machining process may be interrupted because the cutting parameter is incorrect. On the contrary, according to one embodiment of the present disclosure, the smart adjustment system can establish a neural network model via Big Data analysis and provide an estimated cutting parameter for a target machine tool; then, the smart adjustment system can optimize the cutting parameter of the target machine tool via a cutting parameter optimization process; thus, the smart adjustment system can make sure that the machining process can be smooth without being interrupted, such that the target machine tool can achieve the best benefit.

Also, there is, currently, no effective method to immediately determine whether a bandsaw machine is performing a machining process via a proper cutting parameter during the bandsaw machine is in operation; thus, the cutting tool and the workpiece may be damaged because the cutting parameter is improper. On the contrary, according to one embodiment of the present disclosure, the smart adjustment system can immediately modify the cutting parameter of a target machine tool when the target machine tool is in operation, so can realize best machining quality and effectively prevent the cutting tool and the workpiece from being damaged.

Moreover, according to one embodiment of the present disclosure, the smart adjustment system can analyze the cutting factors of a target machine tool via the neural network model to generate the machine evaluation of the target machine tool, so the user can more clearly understand the current status of the target machine tool.

Furthermore, according to one embodiment of the present disclosure, the smart adjustment system can analyze the vibration information and the cutting factors of a target machine tool to generate the cutting tool residual service life and the healthy status value of each of the components of the target machine tool, so the user can more clearly understand the healthy statuses of the cutting tool and all components of the target machine tool, which can better the efficiency of the maintenance for the target machine tool.

Figure 2A:
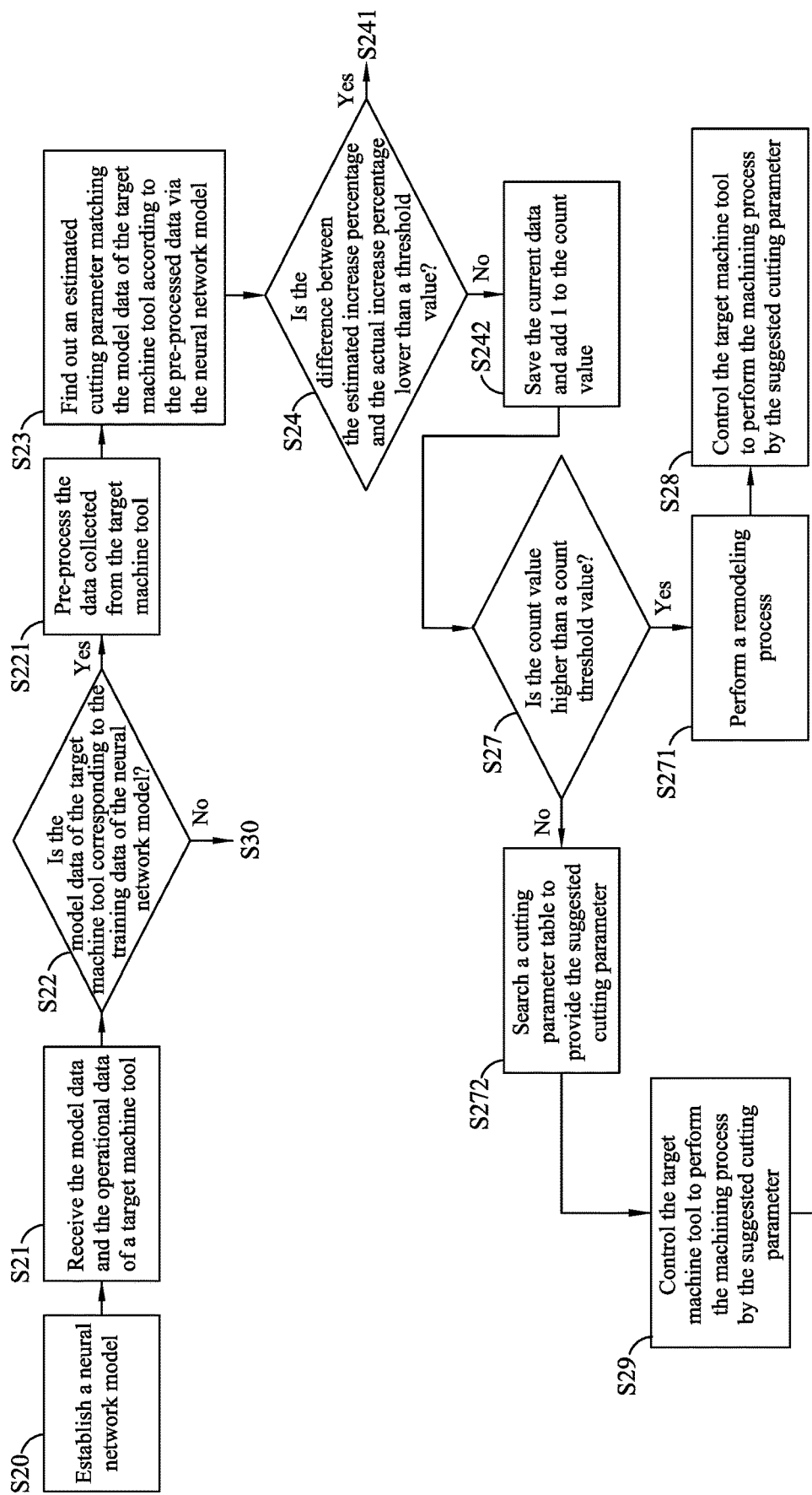
FIG. 2A-FIG. 2C are flow charts of the first embodiment.
Figure 2B:
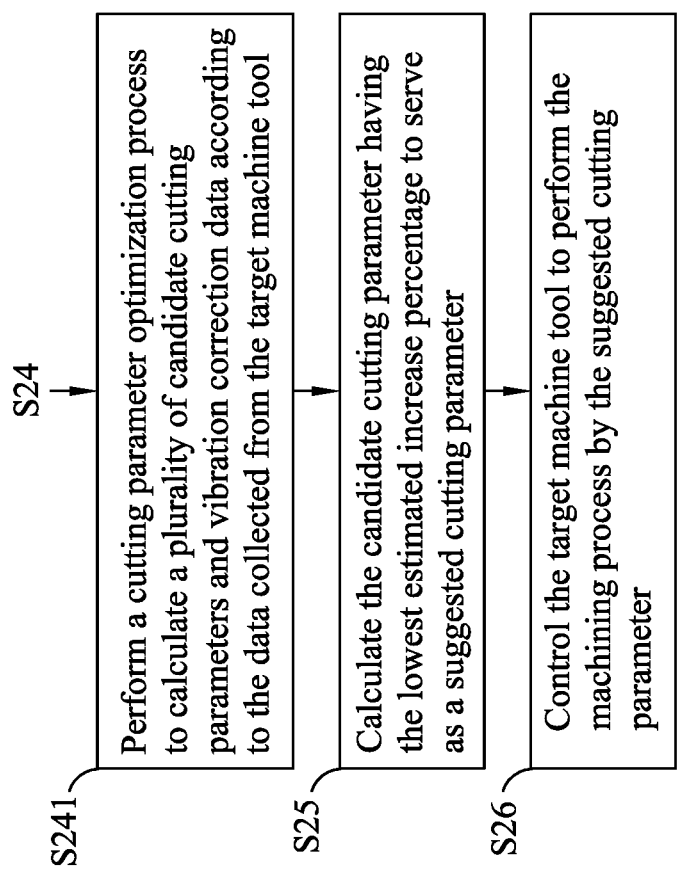
Figure 2C:
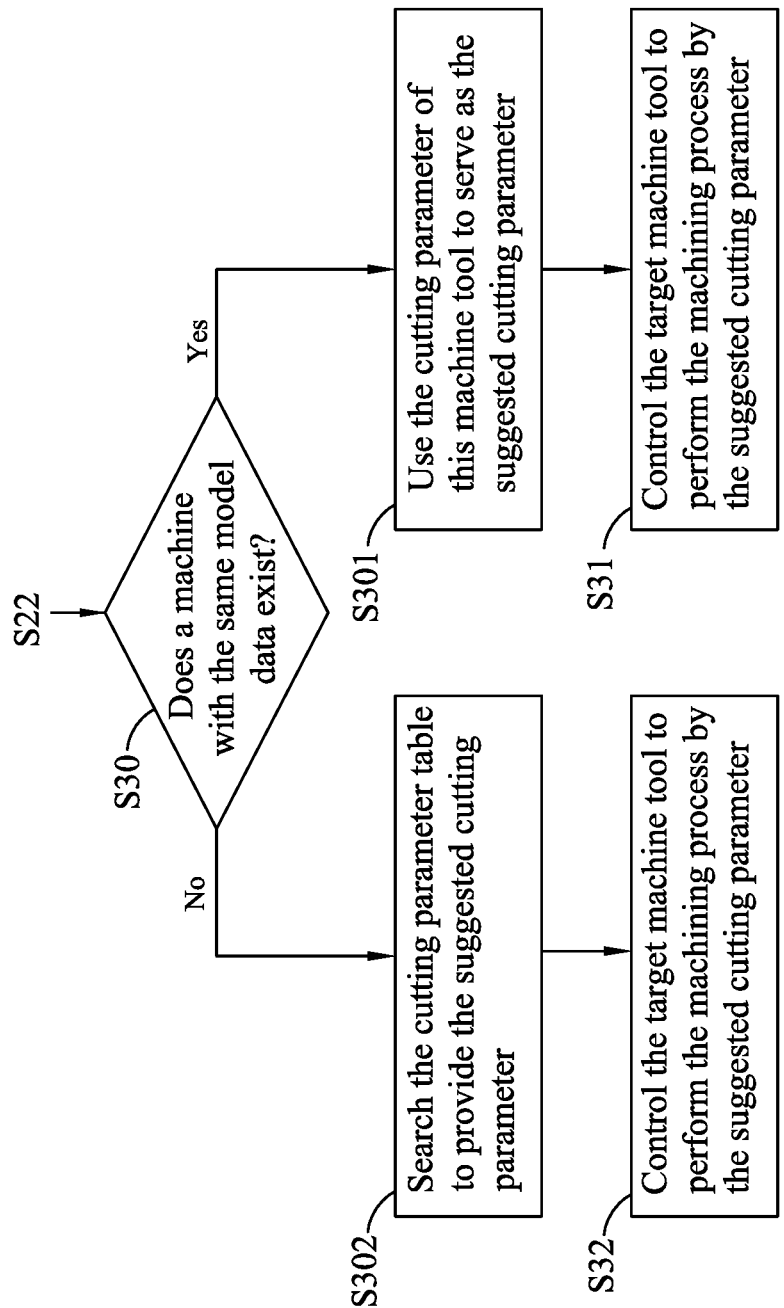

Please refer to FIG. 2A~FIG. 2C, which are the flow charts of the smart adjustment system in accordance with the first embodiment of the present disclosure. The parameter adjustment method of the smart adjustment system 1 includes the following steps:

Step S20: Establish a neural network model; then, the process proceeds to Step S21.

Step S21: Receive the model data and the operational data of a target machine tool; then, the process proceeds to Step S22.

Step S22: Is the model data of the target machine tool corresponding to the training data of the neural network model? If it is, the process proceeds to Step S211; if it is not, the process proceeds to Step S30.

Step S221: Pre-process the data collected from the target machine tool; then, the process proceeds to Step S23.

Step S23: Find out an estimated cutting parameter matching the model data of the target machine tool according to the pre-processed data via the neural network model; then, the process proceeds to Step S24.

Step S24: Calculate the estimated increase percentage of performing a machining process by the estimated cutting parameter or the suggested cutting parameter; then, confirm whether the difference between the estimated increase percentage and the actual increase percentage is lower than a threshold value? If it is, the process proceeds to Step S241; if it is not, the process proceeds to Step S242.

Step S241: Perform a cutting parameter optimization process to calculate a plurality of candidate cutting parameters and vibration correction data according to the data collected from the target machine tool; then, the process proceeds to Step S25.

Step S25: Calculate the candidate cutting parameter having the lowest estimated increase percentage to serve as a suggested cutting parameter; then, the process proceeds to Step S26.

Step S26: Control the target machine tool to perform the machining process by the suggested cutting parameter.

Step S242: Save the current data and add 1 to the count value; then, the process proceeds to Step S27.

Step S27: Is the count value higher than a count threshold value? If it is, the process proceeds to Step S271; if it is not, the process proceeds to Step S272.

Step S271: Perform a remodeling process to generate a new neural network model and generate the suggested cutting parameter via the new neural network model; then, the process proceeds to Step S28.

Step S28: Control the target machine tool to perform the machining process by the suggested cutting parameter.

Step S272: Search a cutting parameter table to provide the suggested cutting parameter; then, the process proceeds to Step S29.

Step S29: Control the target machine tool to perform the machining process by the suggested cutting parameter; then, the process returns to Step S24.

Step S30: Does a machine with the same model data exist? If it does, the process proceeds to Step S301; if it does not, the process proceeds to Step S302.

Step S301: Use the cutting parameter of this machine tool to serve as the suggested cutting parameter; then, the process proceeds to Step S31.

Step S31: Control the target machine tool to perform the machining process by the suggested cutting parameter.

Step S302: Search the cutting parameter table to provide the suggested cutting parameter; then, the process proceeds to Step S32.

Step S32: Control the target machine tool to perform the machining process by the suggested cutting parameter.

Figure 3:
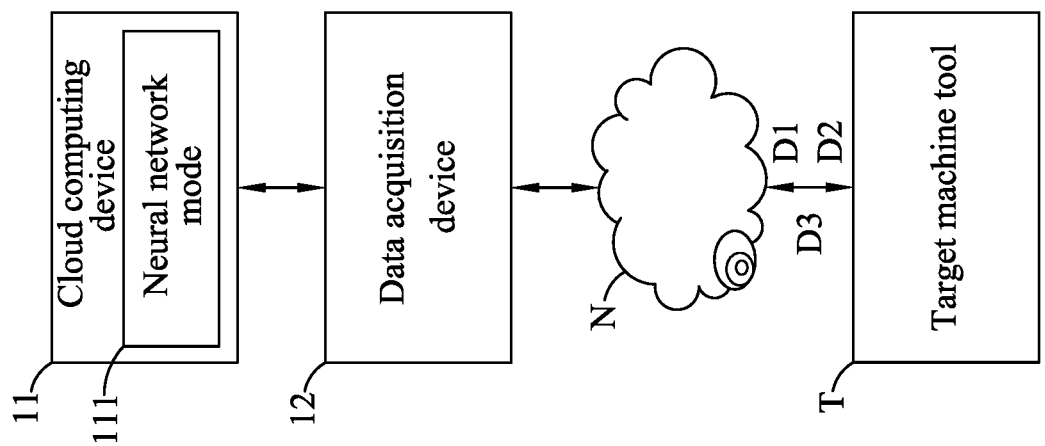
FIG. 3 is a block diagram of a smart adjustment system in accordance with a second embodiment of the present disclosure.
Figure 4:
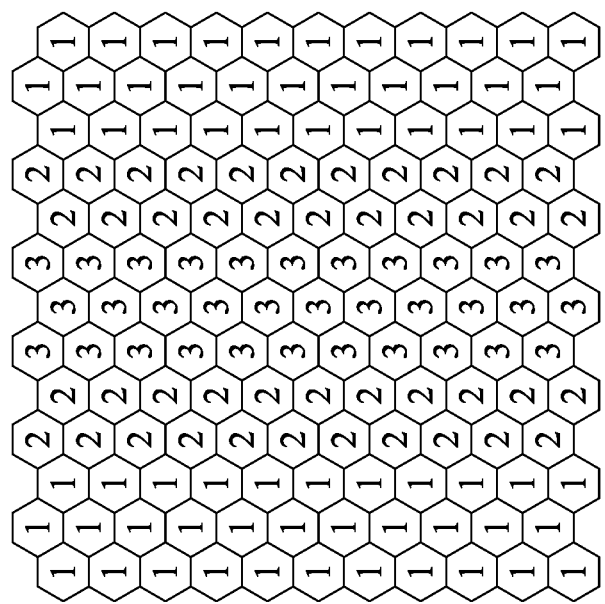
FIG. 4 is a schematic view of the second embodiment.

Please refer to FIG. 3 and FIG. 4, which is a block diagram and a schematic view of a smart adjustment system in accordance with a second embodiment of the present disclosure. As shown in FIG. 3, the smart adjustment system 1 includes a cloud computing device 11 and a data acquisition device 12, which can adjust the cutting parameter of a target machine tool T.

The functions of the above elements and the cooperation relations thereof are similar to those of the previous embodiment, so will not be described herein again. The difference between the embodiment and the previous embodiment is that the cloud computing device 11 further analyze the vibration data D3 of the target machine tool T to generate a pattern fingerprint F, as shown in FIG. 4. Then, the cloud computing device 11 generates a material analysis result according to the pattern fingerprint F in order to find out the material of the workpiece cut by the target machine tool T; in a preferred embodiment, the learning algorithm may be self-organizing map (SOM) algorithm.

During the training process, the cloud computing device 11 analyzes the vibration data of cutting the workpieces made of different materials, generates the pattern fingerprints corresponding to these materials and then integrates the above analysis results with the neural network model 111.

As shown in FIG. 4, each of the cells of the pattern fingerprint F has a corresponding weighting vector, so the cloud computing device 11 compares the pattern fingerprint F generated by the vibration data D3 of the target machine tool T with the pattern fingerprints of all materials to generate the analysis result. In this way, the cloud computing device 11 can confirm the material of the workpiece cut by the target machine tool T.

The embodiment just exemplifies the present disclosure and is not intended to limit the scope of the present disclosure; any equivalent modification and variation according to the spirit of the present disclosure is to be also included within the scope of the following claims and their equivalents.

It is worthy to point out that there is, currently, no effective method to determine whether the basic information, such material type of workpiece, inputted in the bandsaw machine is correct, so the bandsaw and the workpiece may be damaged because the information inputted in the bandsaw machine is incorrect, which may result in serious loss. On the contrary, according to one embodiment of the present disclosure, the smart adjustment system can analyze the vibration data of a target machine tool to generate a pattern fingerprint and generate a material analysis so as to find out the material of the workpiece, which can effectively prevent form losses due to human error.

To sum up, according to one embodiment of the present disclosure, the smart adjustment system can establish a neural network model via Big Data analysis and provide an estimated cutting parameter for a target machine tool; then, the smart adjustment system can optimize the cutting parameter of the target machine tool via a cutting parameter optimization process; thus, the smart adjustment system can make sure that the machining process can be smooth without being interrupted, such that the target machine tool can achieve the best benefit.

Also, according to one embodiment of the present disclosure, the smart adjustment system can immediately modify the cutting parameter of a target machine tool when the target machine tool is in operation, so can realize best machining quality and effectively prevent the cutting tool and the workpiece from being damaged.

Besides, according to one embodiment of the present disclosure, the smart adjustment system can analyze the vibration data of a target machine tool to generate a pattern fingerprint and generate a material analysis so as to find out the material of the workpiece, which can effectively prevent form losses due to human error.

Moreover, according to one embodiment of the present disclosure, the smart adjustment system can analyze the cutting factors of a target machine tool via the neural network model to generate the machine evaluation of the target machine tool, so the user can more clearly understand the current status of the target machine tool.

Furthermore, according to one embodiment of the present disclosure, the smart adjustment system can analyze the vibration information and the cutting factors of a target machine tool to generate the cutting tool residual service life and the healthy status value of each of the components of the target machine tool, so the user can more clearly understand the healthy statuses of the cutting tool and all components of the target machine tool, which can better the efficiency of the maintenance for the target machine tool.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A smart adjustment system, comprising:
a cloud computing device, comprising a neural network model, wherein the cloud computing device saves model data of a plurality of machine tools, and estimated increase percentages of each of the machine tools in a plurality of cutting parameters; and
a data acquisition device, configured to receive a model data of a target machine tool;
wherein the cloud computing device compares the model data of the target machine tool with the model data of the machine tools via the neural network model to calculate an estimated cutting parameter having an estimated increase percentage and controls the target machine tool to perform a machining process by the estimated cutting parameter, wherein the estimated increase percentages of each of the machine tool in different cutting parameters are obtained by a training process in advance; the data acquisition device receives an actual increase percentage of the target machine tool from the target machine tool when the target machine tool is performing the machining process and the cloud computing device performs a comparison process to compare the estimated increase percentage with the actual increase percentage in order to generate a comparison result.

2. The smart adjustment system of claim 1, wherein if the comparison result shows that a difference between the estimated increase percentage and the actual increase percentage is higher than a threshold value, the cloud computing device adds 1 to a count value, generates a suggested cutting parameter according to a cutting parameter table and re-performs the comparison process according to the actual increase percentage of the target machine tool performing the machining process by the suggested cutting parameter.

3. The smart adjustment system of claim 2, wherein if the count value is higher than a count threshold value, the cloud computing device performs a remodeling process to generate a new neural network model and generates the suggested cutting parameter via the new neural network model.

4. The smart adjustment system of claim 1, wherein if the comparison result shows that a difference between the estimated increase percentage and the actual increase percentage is lower than a threshold value, the cloud computing device performs a cutting parameter optimization process.

5. The smart adjustment system of claim 4, wherein the data acquisition device further receives a vibration data of the target machine tool.

6. The smart adjustment system of claim 5, wherein the cloud computing device calculates a plurality of candidate cutting parameters and a vibration correction data according to the model data and the vibration data of the target machine tool via the neural network model during the cutting parameter optimization process so as to determine the candidate cutting parameter having the lowest estimated increase percentage to serve as a suggested cutting parameter.

7. The smart adjustment system of claim 5, wherein the cloud computing device estimates a cutting tool residual service life of the target machine tool by analyzing the vibration data of the target machine tool.

8. The smart adjustment system of claim 5, wherein the cloud computing device analyzes the vibration data of the target machine tool via a learning algorithm to generate a pattern fingerprint and generates a material analysis result according to the pattern fingerprint.

9. The smart adjustment system of claim 1, wherein the cloud computing device further analyzes a plurality of cutting factors of each of the machine tools to generate factor weight directivities of the cutting factors and integrates the factor weight directivities of the cutting factors with the neural network model; the data acquisition device further receives the cutting factors of the target machine tool and the cloud computing device analyzes the cutting factors via the neural network model in order to generate a machine evaluation of the target machine tool.

10. A smart adjustment method, comprising:
  establishing a neural network model saving model data of a plurality of machine tools, and estimated increase percentages of each of the machine tools in a plurality of cutting parameters by a cloud computing device;
  receiving a model data of a target machine tool by a data acquisition device;
  comparing the model data of the target machine tool with the model data of the machine tools via the neural network model by the cloud computing device so as to calculate an estimated cutting parameter having an estimated increase percentage, wherein the estimated increase percentages of each of the machine tool in different cutting parameters are obtained by a training process in advance;
  controlling the target machine tool to perform a machining process by the estimated cutting parameter by the cloud computing device; and
  receiving an actual increase percentage of the target machine tool from the target machine tool when the target machine tool is performing the machining process by the data acquisition device and performing a comparison process to compare the estimated increase percentage with the actual increase percentage in order to generate a comparison result by the cloud computing device.

11. The smart adjustment method of claim 10, further comprising:
  adding 1 to a count value, generating a suggested cutting parameter according to a cutting parameter table and re-performing the comparison process according to the actual increase percentage of the target machine tool performing the machining process by the suggested cutting parameter if the comparison result shows that a difference between the estimated increase percentage and the actual increase percentage is higher than a threshold value.

12. The smart adjustment method of claim 11, further comprising:
  performing a remodeling process to generate a new neural network model and generating the suggested cutting parameter via the new neural network model if the count value is higher than a count threshold value.

13. The smart adjustment method of claim 10, further comprising:
  performing a cutting parameter optimization process if the comparison result shows that a difference between the estimated increase percentage and the actual increase percentage is lower than a threshold value.

14. The smart adjustment method of claim 13, further comprising:
  receiving a vibration data of the target machine tool.

15. The smart adjustment method of claim 14, further comprising:
  calculating a plurality of candidate cutting parameters and a vibration correction data according to the model data and the vibration data of the target machine tool via the neural network model during the cutting parameter optimization process so as to determine the candidate cutting parameter having the lowest estimated increase percentage to serve as a suggested cutting parameter.

16. The smart adjustment method of claim 14, further comprising:
  estimating a cutting tool residual service life of the target machine tool by analyzing the vibration data of the target machine tool.

17. The smart adjustment method of claim 14, further comprising:
  analyzing the vibration data of the target machine tool via a learning algorithm to generate a pattern fingerprint and generates a material analysis result according to the pattern fingerprint.

18. The smart adjustment method of claim 10, further comprising:
  analyzing a plurality of cutting factors of each of the machine tools to generate factor weight directivities of the cutting factors and integrating the factor weight directivities of the cutting factors with the neural network model; and
  receiving the cutting factors of the target machine tool and analyzing the cutting factors via the neural network model in order to generate a machine evaluation of the target machine tool.

* * * * *